May 5, 1942.                    W. CARSON                    2,281,674
                            AUTO DIRECTION SIGNAL
                            Filed May 1, 1939                 2 Sheets-Sheet 1

INVENTOR
William Carson
By Ralph Burch
Attorney

May 5, 1942.  W. CARSON  2,281,674
AUTO DIRECTION SIGNAL
Filed May 1, 1939  2 Sheets-Sheet 2
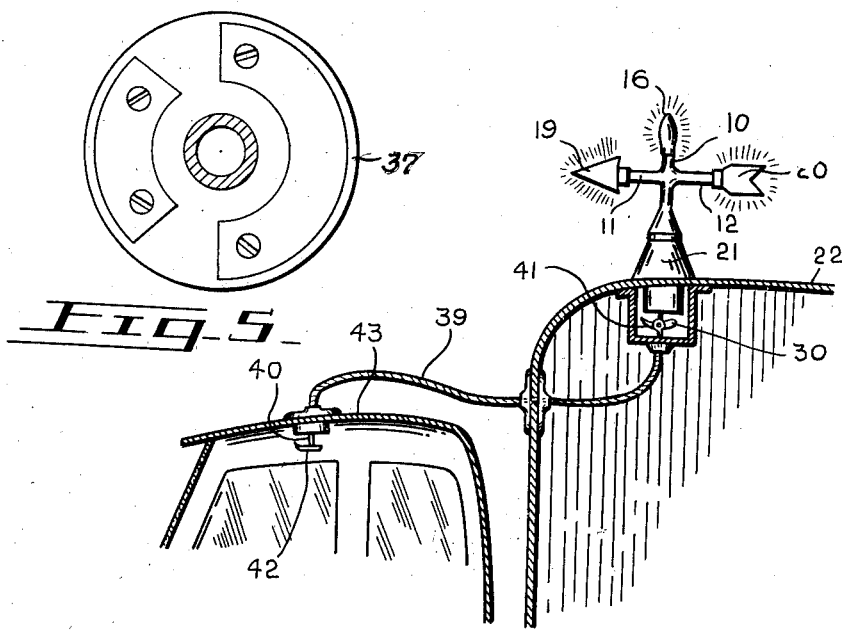
Fig. 5.
Fig. 3.
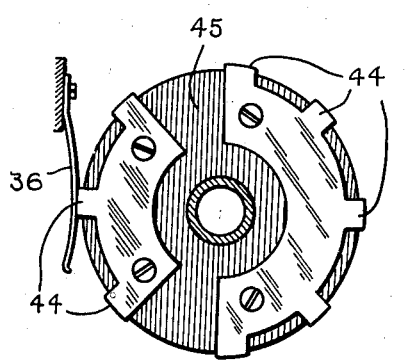
Fig. 4.
INVENTOR
William Carson
By Ralph Burch
Attorney Patented May 5, 1942

2,281,674

UNITED STATES PATENT OFFICE 2,281,674

AUTO DIRECTION SIGNAL

William Carson, Vancouver, British Columbia, Canada

Application May 1, 1939, Serial No. 271,144

1 Claim. (Cl. 116—46)

This invention relates to improvements in an auto direction signal. Its primary object being to provide means whereby an operator of a motor vehicle may signal his intentions to others either in front or at the rear with regard to the direction he intends to follow.

A further object of the invention is to provide such a device to be mounted on the roof of an automobile and to be operable from the inside by manipulation adjacent the operator's seat.

A still further object of the invention is to provide means to illuminate the device for night use and to make the same more conspicuous from front or rear in the daytime also when so required.

With these and other objects in view that may appear while the description proceeds the invention consists of the novel construction and arrangement of parts as hereinafter more specifically set forth, claimed and shown in the accompanying drawings forming part of this application and in which:

Fig. 3 is a fragmentary view of the device applied to a large truck.

Fig. 4 is a detail view of the contact ring.

Fig. 5 is a plan view of the contact ring embodied in the construction of the device shown in Fig. 2.

Figure 1:
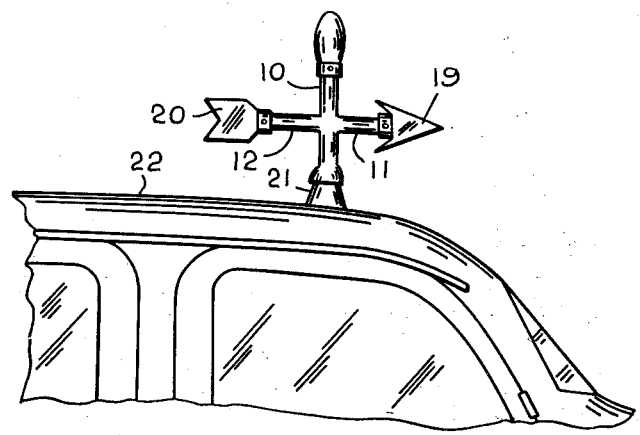
Fig. 1 is a fragmentary view of an automobile having my invention mounted thereon.
Figure 2:
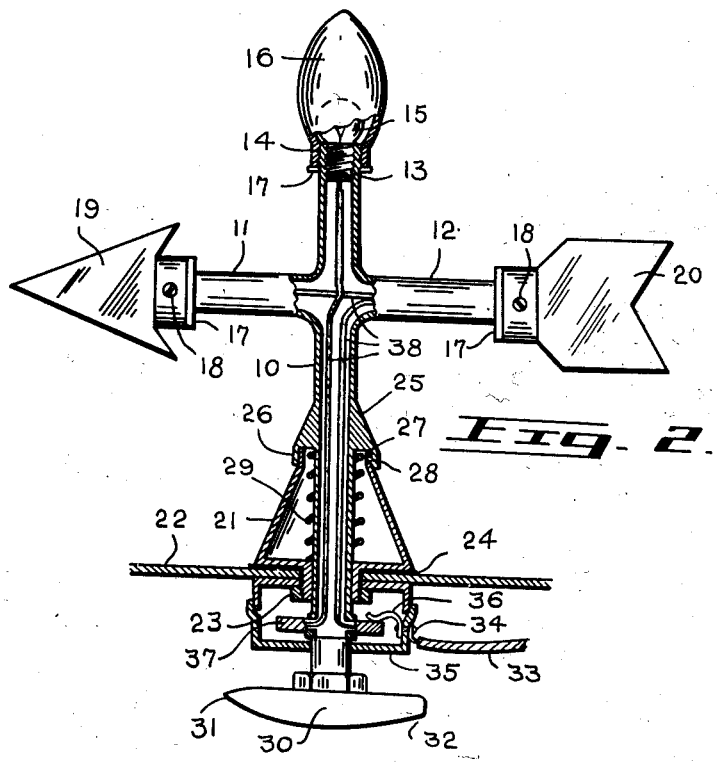
Fig. 2 is an enlarged elevation of the device partially in section.

Referring more in detail to the drawings in which similar reference characters designate corresponding parts throughout the several views it will be seen the invention consists of a hollow metallic standard 10 having cross arms 11 and 12 formed thereon. Each of said cross arms is constructed with an electric light bulb socket 13 therein and a screw threaded tubular member 14 on the outside thereof. Bulbs 15 are provided to illuminate the device and are secured in the sockets 13 in the customary manner. Transparent shells in the shape shown are provided to cover the light bulbs. The center shell 16 being egg shaped and preferably of green colour is secured on the tubular member 14 by the screw threads and is tightened against a flange 17 provided for that purpose. A set screw 18 is also provided to prevent the device from becoming loose through vibration or other causes.

The cross arms 11 and 12 are provided with transparencies in the shape of a head 19 and tail 20 of an arrow. These are preferably coloured red and are secured over the bulbs in the manner previously described.

The standard is rotatably mounted in a base 21 which is secured in an aperture in the roof 22 of an automobile body by means of a clamp nut 23. A rubber gasket 24 is provided to make a water tight joint. The base is conical in shape and a collar 25 is formed on the standard 10 having a depending flange 26 to engage the top of the base in order to exclude water. Position slots 27 are formed in the top edge of the base at each quadrant and a pin 28 is provided in the flange 26 to engage the same. This gives the operator an opportunity to ascertain by touch when the signal is turned from one direction fully to the other and also provides means to retain the same in a set position. A contractile spring 29 has one end secured to the bottom of base 21 and its opposite end to the underneath side of the collar 25 in a manner to normally draw the collar downward toward the base thereby yieldably retaining the pin 28 in which ever slot 27 it is placed. A handle 30 positioned in easy reach of the operator is secured on the bottom end of the standard. The handle is shaped with a pointed end 31 and a blunt end 32 which are arranged in correspondence with the arrow of the signal so that the operator may know at all times which way the signal is pointing by feeling at the handle without the necessity of having to take his eyes from the road to look at the same.

The electrical circuit is of the usual arrangement to be included in a standard electrical circuit with single positive wiring and grounded return. A wire 33 conducts the current from a switch (not shown) to a bolt 34 in a box cover 35, of Bakelite or other non-conductive material. A spring contact element 36 is secured on the inside of the said cover by the bolt 34 and engages a contact ring 37 attached to the standard and insulated therefrom. The contact ring 37 consists of two segments of different sizes and wires 38 are carried from the contact ring through the hollow standard to the several bulb sockets to deliver the current thereto. The wire from the larger segment leads to signal elements 19 and 20 and when the contact element 36 contactly engages the larger segment the elements 19 and 20 are illuminated. The wire leading from the smaller segment leads to the signal element 16 which is only provided for decorative purposes and when the signal is turned so that the spring contact engages the smaller segment the signal elements 19 and 20 are extinguished while the element 16 is illuminated.

In Fig. 3 the device is shown mounted on a large truck wherein the body is higher than the cab. A flexible cable 39 having a steel wire 40 therein is attached to the handle 30 by a clamp 41. A handle 42 similar to the handle 30 is mounted in the cab 43 as shown and connected to the said steel wire. In this manner the movement of the said handle 42 is transmitted to the handle 30 and the device actuated in the manner previously described.

A modification of the collector ring is shown in Fig. 4 wherein the circuit is broken and made again as the ring is turned by the action of the handle. A plurality of contact points 44 are arranged around the periphery of the Bakelite ring 45 in a manner to make and break the current as the said points engage and disengage the spring contact element 36 causing the lights in the warning signal to flash on and off and thereby attract attention to the same.

From the foregoing it will be seen the device is readily operable from the operator's seat, and is manipulated first with a light upward movement to raise the pin 28 from the slot 27 in which it happens to be, then by a quarter turn in the direction it is intended to go at which time the pin will engage another slot and be held therein until the turn has been made and the signal is returned to its formal position.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

In a direction signal for vehicles comprising a hollow conical shaped base secured to the top of the vehicle, a rotatable hollow standard extending through said base and the top of the vehicle, signalling means on the upper end of said standard, a hand grip on the lower end of said standard, a collar on said standard above said base having a depending annular flange adapted to engage over the upper end of said base, a pin protruding from the flange of said collar adapted to engage in notches formed in the upper edge of said base, and a contractile spring mounted on said standard within said base having one end attached to said collar and its opposite end to the bottom of said base.

WILLIAM CARSON.